Oct. 30, 1956   L. D. WHEELER ET AL   2,768,688
APPARATUS FOR CUTTING A ROVING OF FIBROUS MATERIAL
Filed Aug. 26, 1953

INVENTOR.
Leland D. Wheeler
Leroy Swanson
By ATTORNEY

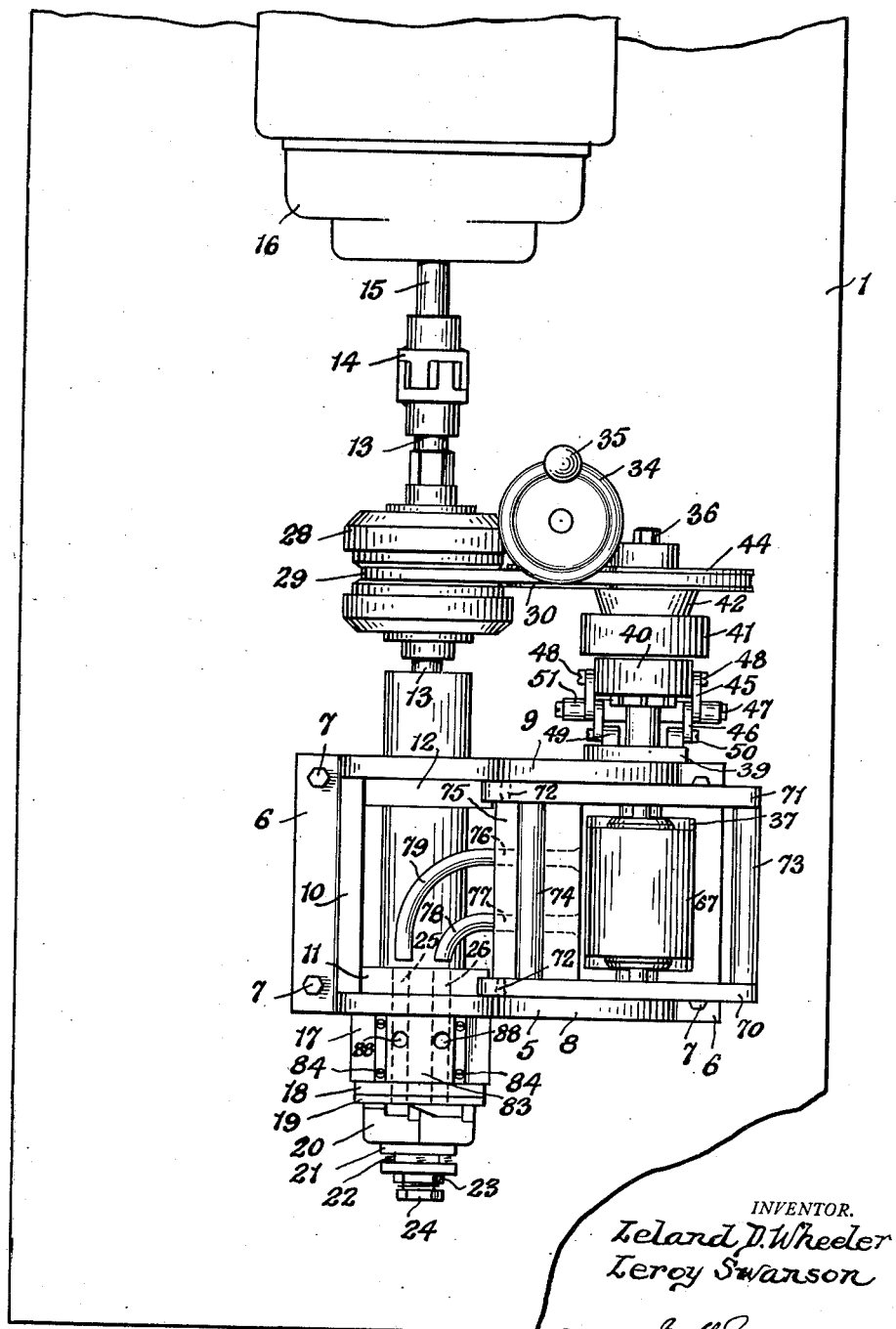

Oct. 30, 1956     L. D. WHEELER ET AL     2,768,688
APPARATUS FOR CUTTING A ROVING OF FIBROUS MATERIAL
Filed Aug. 26, 1953     3 Sheets-Sheet 3
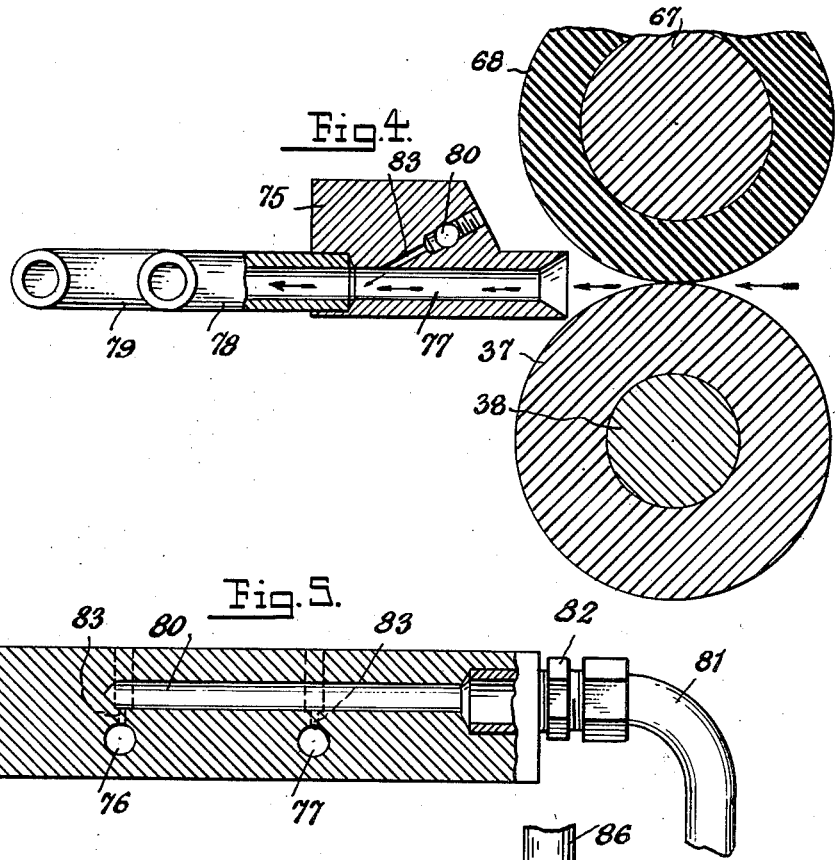
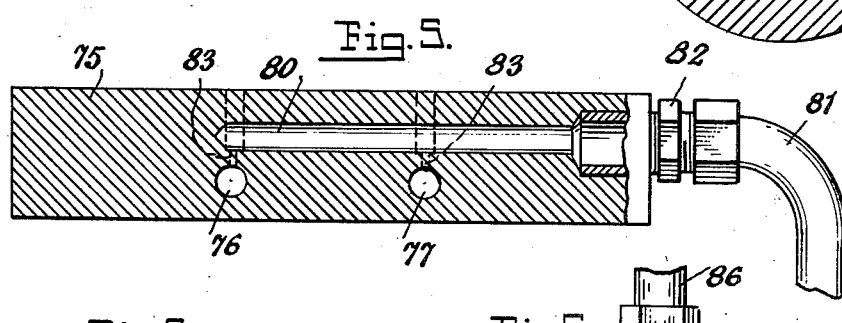
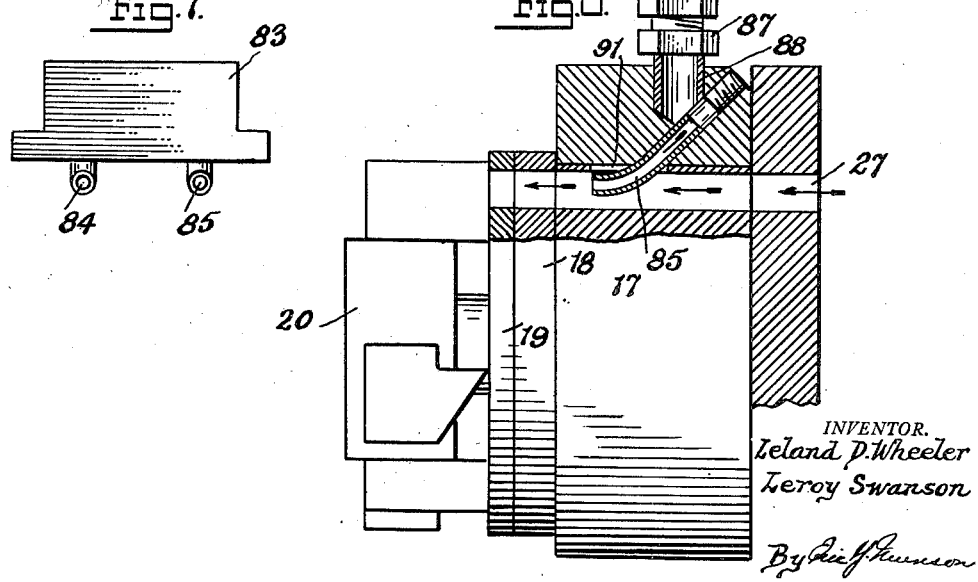

United States Patent Office 2,768,688
Patented Oct. 30, 1956

2,768,688
APPARATUS FOR CUTTING A ROVING OF FIBROUS MATERIAL

Leland D. Wheeler, Bethel, and Leroy Swanson, Danbury, Conn., assignors to Turner Machine Co., Inc., Danbury, Conn., a corporation of Connecticut Application August 26, 1953, Serial No. 376,698

3 Claims. (Cl. 164—61)

This invention relates to a means and method by which threads of fibrous material, particularly spun glass fibres in the form of a roving, are cut into predetermined equal lengths. Such fibres are often used in the production of various types of receptacles and other articles wherein the fibres are deposited in a felted layer upon a suitable form and thereafter plastic material is deposited over the fibres which thereby serve to strongly reinforce the receptacle so formed.

In the production of the glass fibres, it is desirable that all of the cut fibres be of like length; that the cut fibres be separated from one another so that when the same are deposited upon a form the same will fall haphazardly and will lie in all directions, thus criss-crossing one another and forming a strong reinforcement for the receptacle or other article subsequently produced. It is also desirable that the fibres shall have a certain amount of fuzziness or fluff thus increasing their tendency to adhere together when they descend upon one another on a form.

Various means have been devised for the cutting of the fibres into the required lengths, chief of which consists in feeding a so-called roving or rope-like strand composed of a substantial number of the glass threads or other fibrous threads between a rotary, multi-bladed cutter and a rubber roller. The distance between the various blades on such a cutter determines the length of the cut fibres and thus the length of the cut fibres can be regulated only by changing the adjustment of the blades on the cutter or else by the substitution of one cutter for another. A cutting device as above described is not completely satisfactory for various other reasons. One of these reasons is that the sharp edges or the radial blades on the cutter soon cut grooves into the rubber roller; the blades soon fail to cut sharply and cleanly; the rubber of the roller disintegrates under heat and pressure and rubber particles find their way into the batch of cut fibres and subsequently are deposited onto the form over which the fibres fall, thus producing defects in the formed article. Also, the cutters require repeated sharpening. In addition, with such an arrangement no means is provided for the separation of the cut fibres, and as a result, when cut they adhere together in groups or bunches and destroy the desired effect sought, namely, of fibres independently separated and spread in uniform separation over the form on which the article is being made.

It is therefore an object of the present invention to provide a means and method for cutting threads of fibrous material, particularly glass fibres, in predetermined, selected lengths and by means of which control of the length of the cut fibres and the fuzziness thereof can be readily had; by which a positive feed of the fibre threads to the cutting means will be had; by means of which a separating action will be applied to the roving as it is fed to the cutters, thereby insuring a positive separation of the cut fibres, which will fall from the machine in separated individual threads and in readiness for independent deposit on the form arranged for their reception.

It is a further object of the present invention to provide means for aiding in the feed of the threads to the cutter by means of a forced flow of a liquid medium, preferably air jets, which also serves to tension the threads and aid the feed rollers in feeding the same at a positive and uniform rate to the cutter. This means, in addition, serves to separate and lightly fuzz the threads or fibres of the threads, and shall incidentally serve as a cooling means for the cutter.

With these and other objects to be hereinafter set forth in view, we have devised the arrangement of parts to be described, and more particularly pointed out in the claims appended hereto.

In the accompanying drawings, wherein an illustrative embodiment of the invention is described, Fig. 1 is a front elevational view of an apparatus constructed in accordance with the invention;

Fig. 3 is a top plan view of the apparatus, with the air-conveying piping omitted for clearness in illustration;

Fig. 4 is a sectional view through the feed rollers and the air and feed manifold block;

Fig. 5 is a sectional view taken at right angles to that of Fig. 4, through the air and feed manifold block;

Fig. 6 is a side elevation, with parts in section, of the cutting head, showing the air and feed passages therethrough, and Fig. 7 is a front elevation of the air delivery block located adjacent to the cutting head.

Figure 1:
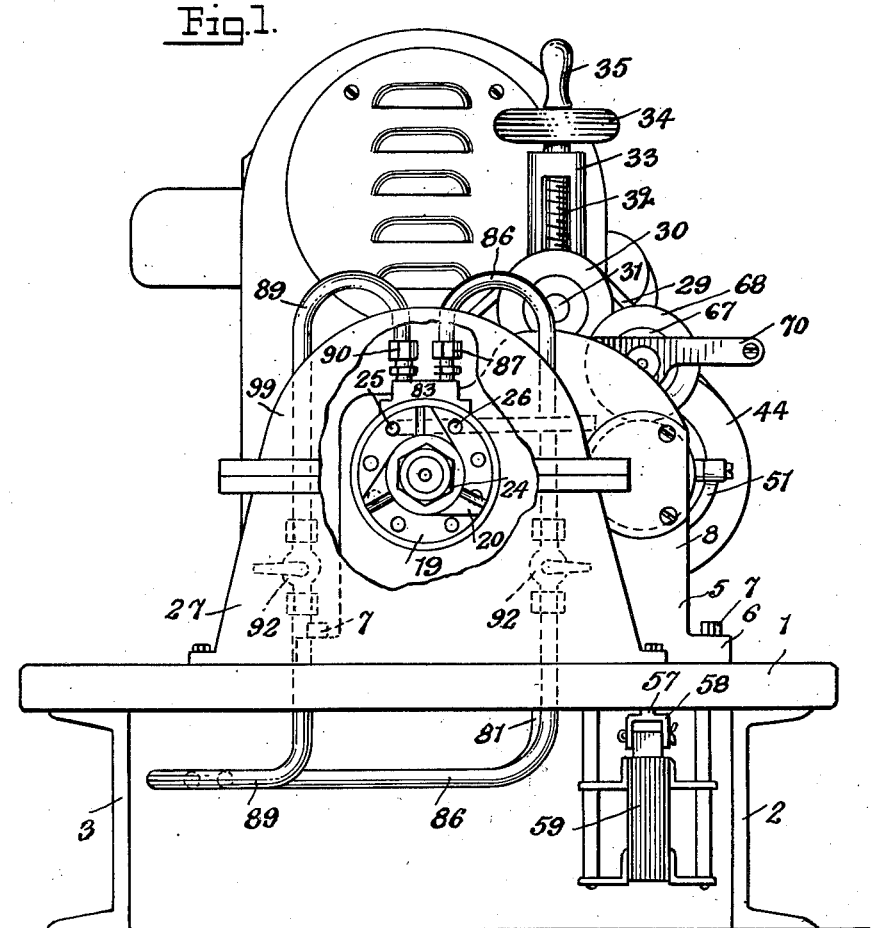

Referring to the drawing, 1 indicates the base or supporting plate for the apparatus, the same being secured to and suitably supported on the beams 2 and 3 which can be in turn mounted on a table or on legs or other suitable means. The main frame of the apparatus is shown at 5 and the same includes a front plate 8 and rear plate 9, these plates being integrally connected at one end by the end plate 10. The frame may be formed as a casting or fabricated in any other suitable manner, and it includes flanges 6 at both ends and by means of which it may be attached to the base plate 1 by screws or bolts 7.

Rotatably mounted in suitable bearings 11 and 12 in the frame 5, is a drive shaft 13, which is connected by means of a coupling 14 to the shaft 15 of a variable-speed electric motor 16 by means of which the drive shaft 13 can be driven at the desired rotational speed.

Secured on the front plate 8 of the frame 5 is a cutting head which includes disks 17, 18 and 19, the same being securely attached to the frame 5 by screws or other fastening elements, and centrally apertured to permit of the rotation of the drive shaft 13 within them. The outermost plate, shown at 19, is of carbon steel and constitutes a shearing plate, since a rotary cutter, shown at 20 and secured on the shaft 13, is operative against the plate 19 to shear off lengths of the fibre glass roving as the same emerges from apertures provided in the shearing plate 19. The rotary cutter is held in shearing contact with the face of the plate 19 by a spring-pressed plate or disk 21 surrounding the drive shaft 13 and urged against the cutter 20 by the springs 22 which are adjustable as to pressure by means of the nut 23 and lock nut 24 on the shaft 13. As will be seen in Figs. 1 and 6, the disks 17, 18 and 19 are provided with a pair of feed passages, indicated at 25 and 26, extending through them, said passages also extending through the frame plate 8, as shown at 27 in Fig. 6, the aligned apertures through the frame plate 8 and through the disks 17, 18 and 19 thus constituting a pair of feed passages for the fibre glass rovings, which passages have their outlets at the face of the shearing plate 19 so that the fibre glass rovings are cut off in required lengths as the same emerge from these passages 25 and 26. The face plate 19 may, as seen in Fig. 1, be provided with additional apertures, permitting shifting of this plate when required as wear occurs about the apertures employed as the stock outlets.

Provided on the drive shaft 13 is a variable pulley 28 around which a belt 29 passes. The belt 29 also extends over an idler pulley 30, rotative on a spindle 31 which is vertically adjustable by rotation of a threaded shaft 32 rotatable in a sleeve 33 secured at its lower end on the base plate 1. The threaded shaft 32 is provided at the top with a hand wheel 34 and crank 35 by means of which the threaded shaft 32 can be rotated to thereby raise or lower the idler pulley 30 and thus increase or decrease the tension on the belt 29 to thereby change the drive ratio from the pulley 28 to a shaft 36 which has a pulley 44 around which the belt 29 extends. Shaft 36 is rotatable in a suitable bearing rising from the base 1. It will thus be apparent that by manipulation of the hand wheel 34 the idler pulley 30 can be raised or lowered and thus the speed of rotation of the shaft 36 can be controlled and the lengths of the fibres cut by the apparatus be regulated accordingly.

Figure 2:
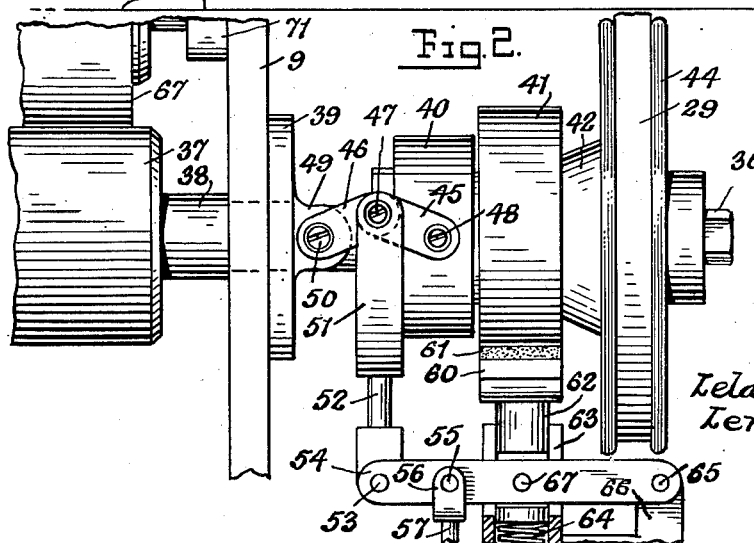
Fig. 2 is a view of the clutch mechanism for the feed roller.

The feed roller is shown at 37, and the same is mounted on a shaft 38, suitably journalled in the walls 8 and 9 of the frame 5. At one end, the shaft 38 extends through a bearing cover 39, and beyond the bearing cover, the shaft 38 carries a clutch collar 40 adapted to move a clutch cone 41 to or from the conical hub 42 provided as a part of the pulley 44. The clutch collar 40 is moved in a manner to cause the cone 41 to be shifted into engaged position with the conical part 42 of the pulley 44, by means of a toggle arrangement consisting of the pivotally connected links 45 and 46. Said links are pivotally connected by the pin 47, the link 45 being pivoted at one end by pivot pin 48 to the collar 40, and the link 46 being pivoted by pin 50 to a lug 49, provided on the bearing cover 39. The toggle just described, is operated by means of a yoke 51, which is connected at the pivot 47 and has a rod 52 extending downwardly and which has its lower end pivoted at 53 to a lever 54. The lever 54 is pivoted at 55 to a yoke 56 on the upper end of a push-rod 57 having its lower end terminating in a yoke 58 (Fig. 1) attached to the armature of a solenoid 59 mounted below the base 1. This arrangement is such that upon the solenoid 59 being energized by the closure of a suitable switch, the rod 57 will be drawn downwardly to thereby cause the clutch collar 40 to be moved toward the right, as viewed in Fig. 2, and thus cause clutch engagement between the cone 41 and the conical part 42 of the pulley 44. It will be apparent that when this occurs, the pulley shaft 36 will become operative to drive the feed roller shaft 37 at the required rate of speed.

When it is desired to halt operation of the feed roller 37, it is necessary that the rotation of shaft 38, carrying the feed roller 37, be halted quickly to avoid cutting off fibres of short length due to a gradual slowing down of the feed roll. Quick stoppage of the rotation of the feed roller is had by a braking means, including a brake shoe 60 provided with a facing 61 operative against the periphery of the clutch cone 41. The shoe 60 is carried by a stem 62 which is vertically guided in a tubular guide member 63 secured on the base plate 1 or otherwise properly mounted. A coil spring 64 contained in the guide member 63 below the end of the stem 62, acts to urge the brake shoe 60 upwardly and into contact with the periphery of the clutch cone 41. As long as the solenoid 59 is de-energized, the spring 64 will hold the brake shoe in applied position. However, when the solenoid is energized and will engage the clutch by means of the toggle mechanism described and including the links 45 and 46, the lever 54, which is pivoted at one end as indicated at 65 in a bracket 66 arising from the base plate 1 and is also centrally pivoted at 67 to the stem 62, will be drawn downwardly and it will then pull the brake shoe 60 down to a released position. As soon as the solenoid is de-energized, the spring 64 will then become effective to elevate the brake shoe 60 and apply it against the clutch cone 41 and quickly stop rotation of shaft 37 and the feed roller 37 carried thereby.

Located above the feed roller 37 is a pressure roller 67, which has a surfacing of rubber 68 or other equivalent soft resilient material. The pressure roller 67 is an idle roller, resting on top of the feed roller 37 and rotating by frictional contact therewith. The rovings of the spun glass are entered between the rollers 37 and 67 from the right as viewed in Figs. 1 and 2 and are fed by the rollers through passages to be described and eventually to the cutting head from which the stock emerges and is cut into lengths.

The pressure roller 67 is supported in a frame including two side bars 70 and 71 in which the roller is mounted in a manner to be freely rotatable. The side bars 70 and 71 are connected by the cross rods 73 and 74, and the frame, composed of the bars 70 and 71 connected by the rods 73 and 74, is pivoted in the machine frame 5 by the pivots 72, thereby permitting upward manual swing of the roller frame and said pivots and the elevation of the roller 67 when it is desired to insert the stock between the rollers.

Mounted in the frame 5 adjacent to the outlet side of the rollers 37 and 67, is a manifold block 75 shown in detail in Figs. 4 and 5. The block 75 is formed with a pair of spaced parallel passages 76 and 77 extending through it and through which two spun glass rovings travel on their way from between the rollers 67 and 37 to the outlet passages 25 and 26 for severance. Secured to and extending from the outlet end of the passage 77 is a curved tube 78 constituting a continuation of the stock feed passage 77, and having its free end located closely adjacent to and in registration with the inner end of the passage 26. Similarly, a curved tube 79 is attached to the end of the passage 76 and extends to a point adjacent to the inner end of the passage 25. From the foregoing, it will be apparent that two rovings of spun glass fed by the rollers 67 and 37 will be directed through the passages 76 and 77, then through the tubes 78 and 79 connected thereto, and then through the passages 25 and 26 to emerge out of the forward ends of the latter passages at the face of the shearing plate 19 to be there severed into selected lengths.

During the feed of the rovings through the passages and tubes as above described, it is desirable that the rovings shall have their fibres separated and also slightly fluffed or fuzzed, and for this purpose air under pressure is admitted into the passages in a manner to be now explained.

As will be seen in Figs. 4 and 5, the block 75 is in the form of an air manifold, and is provided with a longitudinally extending air passage 80 to which an air pipe 81 is attached by a suitable coupling 82 or other means. The passage 80 communicates with a pair of angular air passages 83 which communicate with the respective feed passages 76 and 77. Each of the air passages 83 constitutes a jet opening and enters into its feed passage at an angle as seen in Fig. 4 to thereby direct a stream of air under pressure substantially in the same direction as the travel of the roving through the feed passage, but of course, at a slight angle thereto. The air thus injected into the feed passages 76 and 77 as above described, not only aids in the feed or travel of the roving toward the cutting means, but tends to separate the fibres or threads of the roving and fuzz or slightly fluff the same.

Each roving is subjected to a second air blast on its way to the cutting device. For this purpose, a block 83 is mounted by screws 84 on top of the disk 17. The block 83 is provided with a pair of curved tubes, indicated respectively at 84 and 85 which constitute air jets to direct an air flow into the passages 25 and 26 and in the direction of travel of the rovings through said passages, as indicated by the arrows in Fig. 6. An air-conveying pipe 86 is connected by the coupling 87 into an opening 88 in the block 83, and which opening communicates with the tube 85. Similarly, a second air pipe, shown at 89 is connected by the coupling 90 to an opening in the block 83 that communicates with the second tube, shown at 84 in the manner explained with reference to the air tube 85. The disk 17 is apertured as shown at 91 to allow the free ends of tubes 84 and 85 to fit into the passages 25 and 26 as clearly seen in Fig. 6 and to direct the air flow in the same direction as the movement of the roving.

The air pipes 81, 86 and 89, which are omitted from Fig. 3 to simplify the disclosure of other parts of the device in that figure, extend downwardly through the base 1 where they are connected to a suitable source of air under pressure and which pressure is maintained at a required force to secure desired results. A pressure meter (not shown) may be incorporated in the air line to enable the pressure to be accurately maintained at the desired level. Each of the air pipes 81, 86 and 89 may be provided with a suitable control valve as indicated at 92 in Fig. 1.

From the foregoing, the operation of the apparatus will be readily understood. The rovings to be cut into short fibres, are threaded through the passages 76, 77; through the tubes 78 and 79 leading therefrom and then through the outlet passages 25 and 26, after having been inserted between the rollers 37 and 67. The solenoid 59 is now energized by closing of an electric switch, whereupon the yoke 51 will be drawn downwardly and clutch collar 40 moved to cause engagement of the clutch cone 41 with the pulley 44. Roller 37 will then be rotated and the rovings fed at a speed controlled by regulation of adjusting pulley 30 by manipulation of the hand-wheel 34 to raise or lower said pulley as required to secure the desired speed of the feed roller 37 and hence secure cutting of the rovings into lengths desired. As the rovings travel through the passages, they are subjected to the force of air under pressure by the air jets 83, 84 and 85, and which air tends to not only aid in the feeding of the rovings toward the cutting position, but also separates the fibres of the rovings so that when the cut fibres fall free the same freely separate for descent on a surface in haphazard, criss-cross fashion. In addition, the air fluffs the fibres, creating a desired fuzziness in them which aids in causing the fibres to engage in felted relation when deposited over a form or other element.

It will also be noted that the air blasts emanating from the jets 84 and 85 are forced out of the passages 25 and 26 in a manner to impinge against the rotary cutter 20 during rotation of the same. This has been found to be desirable since it tends to cool the cutter, which, because of the friction of the shearing plate, might, otherwise, become so hot that the fibres will be damaged.

When it is desired to halt operation of the apparatus, the solenoid is de-energized, and the upward force of the spring 64 against the stem 62 will not only disengage the clutch, but will elevate the brake shoe 60 and cause it to speedily halt rotation of the roller 37 and thus promptly discontinue the feed of the rovings to prevent the cutting of short lengths of fibres which would occur by a gradual slowdown of feed of the rovings by the feed rollers.

The cutting apparatus may be enclosed in a protective housing 99 shown in Fig. 1 but omitted from Fig. 3, to prevent flying about of the cut fibres and this housing can be in communication with a suitable chamber or receptacle placed below, or adjacent to, and in communication with the housing 99 to thereby receive the cut fibres therefrom.

While we have shown and described a single embodiment of the invention, it is obvious that the same is not to be restricted thereto, since changes may be readily made without departing from the spirit of the invention. For example, while we have shown the device adapted to cut two rovings, it will be apparent that the same may be adapted without material modification, to cut one or more. These, and other structural alterations, are considered as being within the scope of the invention and comprehended by the claims appended hereto.

What we claim is:

1. An apparatus for cutting rovings of fibre glass into short lengths comprising, a feed roller and means for rotating the same at a selected speed, a clutch operative to couple the feed roller to its rotating means, braking means automatically operative to halt rotation of the feed roller upon release of the clutch, a compressible pressure roller mounted above and in contact with the feed roller and co-operating therewith for feeding a plurality of rovings of fibre glass in spaced, side-by-side relation, a plurality of substantially parallel separate passages each having an open end located adjacent to the rollers whereby the rovings fed by the rollers will be moved longitudinally through the passages, a block through which the passages extend, an air passage leading into the block and having branches in angular communication with the several passages to thereby direct air angularly against and in the direction of feed of the several rovings, a cutting head through which the several passages extend in parallel relation and out of which the passages open, said cutting head having a flat face against which a rotary cutter is shearingly operative, the cutter having its axis parallel to the direction of movement of the rovings as they are cut off by the cutter, the passages having outlets at the face of the cutting head whereby the several rovings will be simultaneously sheared off by the cutter into relatively short lengths as the rovings emerge from the outlets, and means for supplying air under pressure into the passages adjacent to their outlet ends and angularly to the direction of movement of the several rovings toward said outlets, the air so supplied reaching the cutter through said outlets to thereby cool the cutter.

2. An apparatus for cutting fibre glass into short lengths comprising, a feed roller and means for rotating the same at a selected speed, a rotary cutter toward which a roving of fibre glass is fed by the feed roller, said cutter and roller having a fixed relationship between them of rotative speed to enable sections of selected relatively uniform length to be severed from the roving by the cutter, a clutch operative to couple the feed roller and its rotating means, braking means automatically operative to quickly halt rotation of the feed roller upon release of the clutch to thereby avoid cutting of the roving into sections of variable length due to gradual slowing down of the rotative speed of the feed roller, a compressible pressure roller mounted above and in contact with the feed roller and co-operating therewith in feeding the roving to the cutter, and means located near the cutter for supplying an air flow against the roving as it is moved toward the cutter, said air so supplied reaching the cutter to thereby cool the same.

3. In an apparatus for cutting fibre glass into short lengths, a pair of rollers between which a roving of fibre glass is fed, a rotary cutter toward which the roving is fed by the rollers, means for rotating one of the rollers at a speed relative to the rotative speed of the cutter to insure the cutting of uniform-length sections from the roving by the cutter, means for coupling the driven roller to its rotating means, braking means automatically applicable to quickly halt the driven roller when the coupling means disengages the driven roller from its rotating means, to thereby prevent severance of short lengths of roving by the cutter, a guide through which the roving is moved from the rollers to the cutter, and means for directing an air blast against the moving roving while it is moved toward the cutter.

References Cited in the file of this patent

UNITED STATES PATENTS

| | | |
|---|---|---|
| 1,969,770 | Taylor | Aug. 14, 1934 |
| 1,978,826 | Walton et al. | Oct. 30, 1934 |
| 2,173,789 | Nikles et al. | Sept. 19, 1939 |
| 2,182,193 | Blaschke | Dec. 5, 1939 |
| 2,201,180 | Jordan | May 21, 1940 |
| 2,217,766 | Neff | Oct. 15, 1940 |
| 2,323,644 | Castellan | July 6, 1943 |
| 2,563,986 | Bauer | Aug. 14, 1951 |